MOVABLE
AXIALLY ONLY: 25; 42; 63.
AXIALLY & ROTATIONABLY:
30; 34; 53.

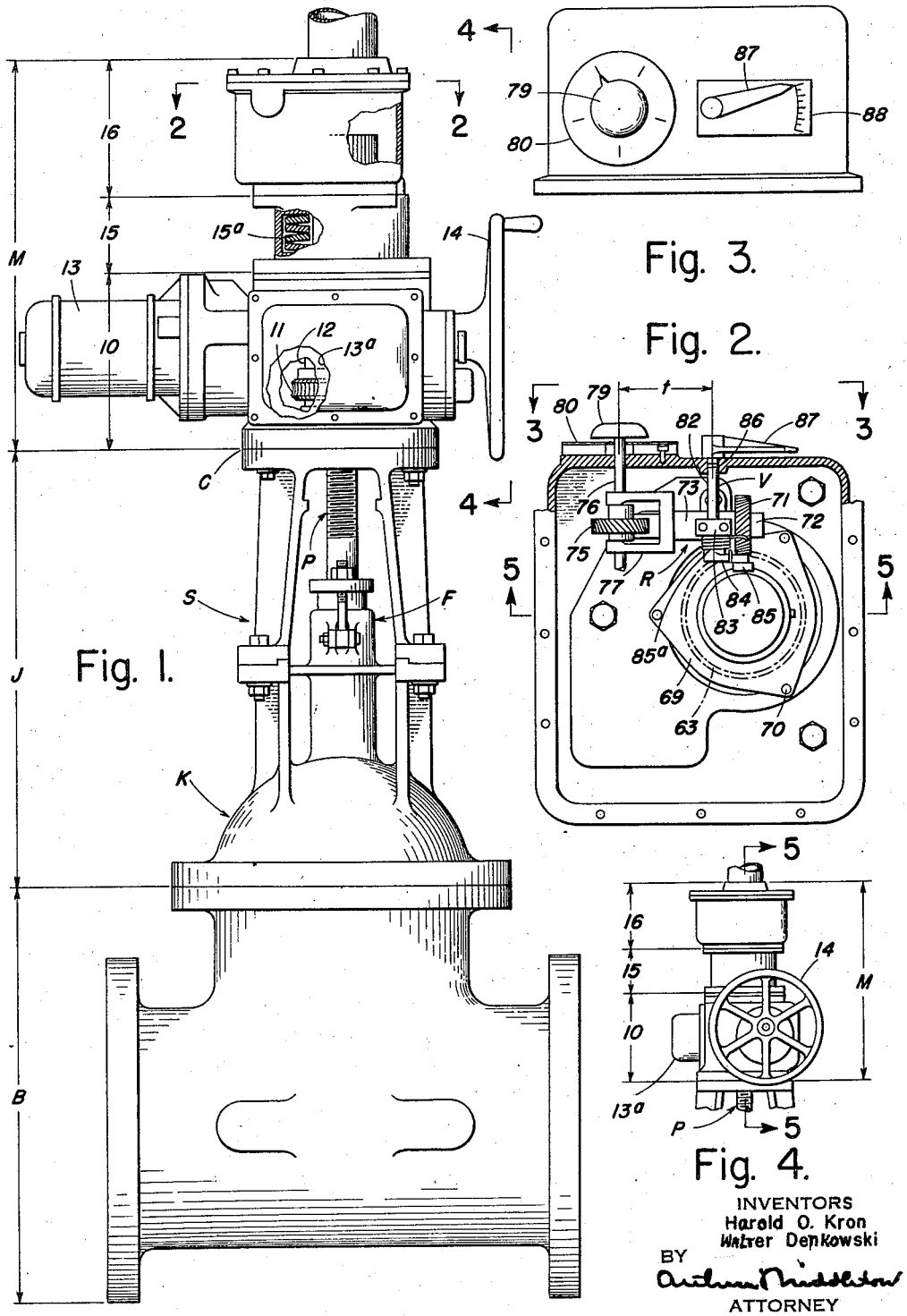

INVENTORS
Harold O. Kron
Walter Denkowski
BY
ATTORNEY

United States Patent Office 2,878,687
Patented Mar. 24, 1959

2,878,687

VALVE OPERATORS

Harold O. Kron, Philadelphia, and Walter Denkowski, Huntington Valley, Pa., assignors to Philadelphia Gear Corporation, a corporation of Pennsylvania Application June 27, 1957, Serial No. 668,408

7 Claims. (Cl. 74—424.8)

This invention relates to power driven actuating mechanism for valves such as gate valves, globe valves, or disc valves, which have a yoke structure containing a drive nut engaging a threaded valve stem for actuating the valve member. The yoke structure also carries the actuating mechanism for rotating the nut, so that rotation of the nut by the mechanism will effect axial movement of the stem for seating or unseating the valve member in the closing and opening respectively of the valve.

The power driven valve actuating mechanism herein contemplated also comprises thrust—or shock—absorbing compensating devices including a compression spring assembly for protecting the valve member against undue seating pressure and the valve stem against excessive thrust. Such excessive pressure or thrust may be occasioned dynamically due to the momentum of the moving parts of the mechanism when the valve member is being seated at the end of the valve closing operation, even though automatic power cut-out be provided. Such devices equally protect the stem against excess thrust and damage such as might otherwise be brought about even under static conditions with the valve closed, as a result of heat expansion of the stem. Whereas the functioning of the thrust responsive spring assembly will protect the stem against excessive thrust forces as well as compensate for heat expansion of the valve stem, the springs will also act to hold the valve closed when the stem contracts.

Therefore, this invention revolves around a power driven valve actuating mechanism which comprises as basic elements a housing mountable on the valve yoke structure, a main—or master—drive sleeve rotatable in the housing but axially confined therein between a pair of thrust and guide bearings such as conical roller bearings, a drive nut concentric within the sleeve and bodily rotatable therewith although axially movable therein as by splining, an annular non-rotatable thrust member operatively and concentrically associated with the nut by way of an annular thrust bearing, and compresssion spring means confined between the axially movable thrust member and a relatively immovable abutment associated with or constituting part of the housing. The master drive sleeve geared to the power drive means proper is rotated through the drive mechanism contained in, or associated with, or carried by the housing for moving the stem axially in one direction or the other to effect opening or closing of the valve. Automatic power cut-off or limit switch devices operate at the end of each opening—or closing—operation. Means for alternate hand operation are provided to activate the basic mechanism in case of power failure.

Nevertheless, "overrunning" of the drive mechanism when closing may bring its momentum to bear upon the valve stem and upon the valve member being seated. Yet, with the compensating means above outlined, the thrust enegy of that momentum is cushioned and absorbed inasmuch as the thrust reaction force of the stem moves the drive nut axially relative to the master sleeve thereby effecting a corresponding compression of the spring means to the extent that they must store up the energy of the momentum. Excessive dynamic shock stresses upon the stem as well as excessive valve seating pressures are thus precluded and damage to other parts of the mechanism avoided. Such a thrust-absorbing compensating device is similarly effective to preclude damage to the stem and to the valve member by absorbing and compensating for extra thrust statically imposed upon the stem where axial heat expansion of the stem is involved.

While a number of such powered valve actuators equipped with thrust-responsive compensating devices have been patented, there nevertheless has remained the unsolved practical problem of providing a thrust compensating device as well as a particular type of spring element that is accurately thrust-responsive and well balanced in relation to the kind and magnitude of stresses to be encountered, as well as readily accessible for inspection, adjustment, or repair without requiring the bulk of the drive mechanism of any of its accessories and limit switch devices to be dismounted or otherwise disturbed.

Accurate and well-balanced thrust responsiveness as proposed by this invention means that the extent of axial displacement of the thrust member should accurately reflect the degree of compressive force exerted upon the thrust absorbing springs. The extent of spring compression in turn should be a true reflection and measure of the valve seating pressure or of the compression stress exerted upon the stem, resulting either from the dynamic valve closing effects or from static heat expansion effects or from both.

In view of such refinements relative to the thrust responsiveness as contemplated by this invention it is also important to provide simple and accurate devices for indicating the degree of spring compression as a measure of the thrust or valve seating pressures, thus to furnish reliable criteria whereby the function of the mechanism can be judged under conditions of practical operation in the field, and the function be diagnosed and corrected whenever necessary. To have available such a criterion is important inasmuch as the actual conditions to be met are by no means readily predictable.

The spring compression indicator together with the special arrangement and accessibility of the thrust responsive compensating devices provide a positive procedure for adjusting the valve unit to operate in a range of optimum thrust responsiveness relative to whatever operational conditions must be met.

Briefly then, it is among the objects to provide in and for the power driven valve actuating mechanism a thrust compensating device having accurate thrust responsive characteristics; is readily accessible for inspection and adjustment or replacement of the springs; and readily lends itself for combination therewith or embodiment therein of simple and accurate spring compression indicator means.

Another aspect of this invention relating to its thrust responsiveness lies in the fact that it is desirable and of highly practical importance that the thrust compensating device be in the nature of a sub-assembly readily applicable to and connectible with power driven valve-actuating mechanism originally installed without such a device. In other words, such a device is to be readily convertible even in the field into one that is accurately and effectively thrust responsive. Conversely, it is desirable to have the valve unit readily operable even though the compensating device be removed as for adjustment, inspection, or repair.

Hence, it is another object to provide such a thrust responsive device to have all the initially mentioned characteristics of accuracy, effectiveness and responsiveness, and in addition to constitute a sub-assembly readily attachable to or removable from the valve actuating mechanism proper.

Still another object of practical importance is to provide a valve-actuating unit sectionalized in such a manner that the actuating mechanism proper represents the first or basic section; the thrust-responsive compensating devices to represent the second section adaptable and attachable to the basic section; and a third section adaptable and attachable to the second section in super position thereto, to contain such operational diagnosing and indicating devices as the spring compression indicator together with a revolution counter for the drive nut for the purpose of indicating the position or registering the movement of the valve spindle during valve opening and closing.

The foregoing objects are realizable in a sectionalized structure which comprises a first section having a first—or basic—housing carried by the yoke structure proper and containing the actuating mechanism, with the thrust-responsive sub-assembly or second section mounted atop the basic housing. Notably, a special rotatable and axially movable adaptor thrust transmitting member functionally interconnects the drive nut of the first section with a spring-loaded thrust member of the second section by way of an annular thrust bearing surrounding this rotatable adaptor member while sustaining the downward pressure of the spring-loaded thrust member which is non-rotatable. The sub-assembly is removable with the adaptor member.

The spring loaded non-rotatable thrust member itself is generally bell-shaped in a manner characteristic of this invention, its shape comprising a wide cylindrical bottom—or body—portion housing the aforementioned annular thrust bearing between it and the special adaptor member, and a hollow cylindrical neck of considerably smaller diameter rising from the large diameter body portion to constitute therewith an amply dimensioned shoulder or annular horizontal bearing face extending transversely of the stem axis. Seated upon this annular bearing face and surrounding the neck portion of the thrust member is a set of superposed annular disc springs, confined as in a cartridge chamber between the annular bearing face and a surrounding auxiliary housing or cap surrounding this spring assembly on the thrust member and fastened to the top of the first or basic housing.

Characteristic of this invention is the important fact that this specially shaped thrust member has its upper neck portion guided with a sliding fit in the top end of the auxiliary housing while the lower body portion is guided with a sliding fit at the bottom of this housing. The significance of such positive guidance lies in the fact that the axial movements of the thrust member being thus efficiently and independently guided, will reflect accurately and without binding the amount of thrust reaction exerted upon the stem, aided by the peripherally uniform distribution of the annular spring pressure acting upon the annular bearing face of the thrust member. In other words, the task of operationally stabilizing the spring assembly here rests largely upon the mounting of the thrust member itself rather than upon the thrust bearing supporting it.

Another more specific feature lies in the unique manner in which the tubular adaptor member is mounted upon and connected to the driving nut, with the lower end of the adaptor member seated upon and surrounding the top end of the nut, and the top end of the master drive sleeve in turn surrounding the lower end of the adaptor member.

Another specific feature provides that the top end portion of the master drive sleeve, while surrounding the lower end portion of the tubular adaptor member, is in turn surrounded by the upper thrust—and guide—roller bearing of the master sleeve. This guide roller bearing has its outer bearing face seated in an annular bearing plate which not only constitutes the top of the basic housing but as such also provides the sliding fit for guidance of the body portion of the thrust member loaded by the springs.

More precisely, this annular bearing plate here serving a unique dual purpose has a flange portion whereby it is interposed between the top face of the basic housing and the bottom flange of the auxiliary housing or cap. A cylindrical portion extends down from the flange portion providing downwardly the seat for the aforementioned bearing face for the drive sleeve, whereas upwardly it provides the sliding cylindrical fit for the body portion of the thrust member aforementioned.

According to still another feature, a third operational section here also termed the indicator section or indicator box is superimposed upon the second section or thrust-responsive device. This third section provides a third housing or instrument box detachably fastened to the second or intermediate section. In order to actuate the indicating devices in the instrument box from the drive nut located far below in the first or basic section, there is provided a special tubular extension member substantially in the form of a straight length of tubing telescopically seated in the adaptor thrust member and fixedly although detachably connected thereto.

This tubular extension member while surrounding the valve stem and rotatable together with the nut rises through the second section and thus through the non-rotatable thrust member thereof, to protrude high enough into the third section or indicator box, to actuate at once both the aforementioned operational indicating devices therein. One of these devices is the spring compression indicator actuated by a rocker arm or feeler finger riding the top edge of the tubular extension member and thus responsive to the axial thrust-absorbing movements of the driving nut. The second or associated companion indicating device is in effect a revolution counter geared to the rotation of the tubular extension member by way of spline connection with the upwardly protruding top end portion of the tubular extension member. This third section or indicator box is a sub-assembly in itself which as such is attachable to or removable from the basic combination of the valve actuating unit which in turn comprises the two other operating sections containing the basic actuating mechanism and the thrust-responsive means respectively.

In the drawings:

Fig. 1 is a general side view of the valve actuating mechanism as mounted upon a valve body, including the basic operating section containing the drive means proper, the second or intermediate operating section containing the thrust-responsive compensating device and the third or top operating section containing the indicating devices.

Fig. 2 is a top view on line 2—2 of Fig. 1 upon the indicating devices contained in the third or top section of the mechanism.

Fig. 3 is detail side view taken on line 3—3 of Fig. 2 showing outside indicators and graduations for the indicating devices contained in the third operating section of the mechanism.

Fig. 4 is a side view of the valve actuating mechanism taken on line 4—4 of Fig. 1.

Fig. 8 is a detail view showing a vertical thrust ball bearing substitutable for the corresponding conical roller bearing of Fig. 6.

Figure 5:
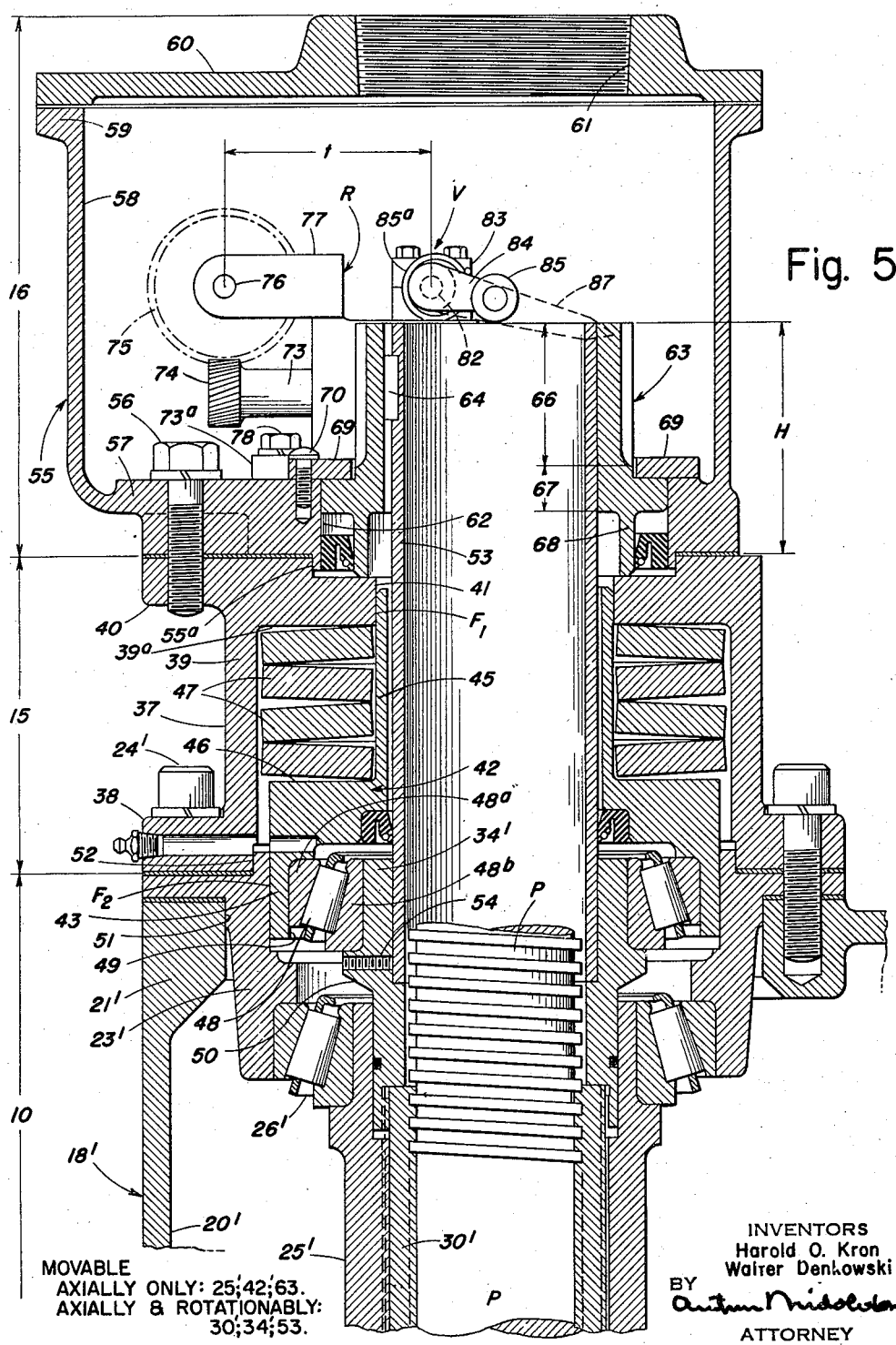
Fig. 5 is a vertical sectional view taken on line 5—5 of Fig. 4, although with the lower end portion of the mechanism broken away.

The valve actuating mechanism embodying this invention as shown in Fig. 1 is designated by the letter M, being mounted through flange connection C upon the familiar yoke structure S that rises from the valve cover K which in turn is flange-connected to the valve body or valve housing designated by the letter B containing for example a disc—or gate—valve member. The yoke structure S and the valve cover K are here jointly designated as the structural section J. Hence the valve unit as here exemplified comprises the actuating mechanism M, the structural section J and the valve housing B.

The valve unit further comprises a threaded valve stem P passing upward through a stuffing box F associated with the yoke structure S into driving engagement with the actuating mechanism M.

The power driven actuating mechanism M comprises a first or basic operating section 10 containing usual drive mechanism indicated by the worm gear 11 (28 in Fig. 6) fastened to a master drive sleeve 12 (25 in Fig. 6) the rotation of which imparts up—or down—movement to the valve stem for valve opening and closing. The section 10 further comprises a drive motor 13, and a hand wheel 14 indicating the provision of de-clutchable means for hand operation of the mechanism as in case of power failure. This basic or main or first operating section 10 also comprises limit switches for safely limiting the valve opening—and closing—movements, contained in a lateral compartment as indicated by a lateral cover plate 13a. Usually the basic mechanism also contains automatic de-clutching devices associated with the hand-operated means for safeguarding the operator when power actuation unexpectedly takes over. The invention, however, is concerned with the basic power-driven actuating mechanism in conjunction with thrust-responsive compensating devices for resiliently absorbing the valve seating axial thrust reaction force exerted upon the stem, thus to protect the valve member, the stem and the mechanism against excessive strain or possible damage.

Upon the first or basic operating section 10 of the Fig. 1 mechanism there is mounted a second or intermediate operating section 15 containing the thrust-responsive compensating devices comprising a set of superposed dished disc springs 15a (47 in Figs. 5 and 6) indicative of the nature of the thrust-responsive compensating device of the invention.

Atop the second or intermediate operating section 15 is mounted the third—or top—operating section herein also termed the instrument box 16 containing jointly those operational devices which indicate the magnitude of the thrust reaction force of the valve stem as measured by the degree of spring compression, and those which indicate the position or register the movement of the valve stem at any time during the opening or closing of the valve.

Figure 6:
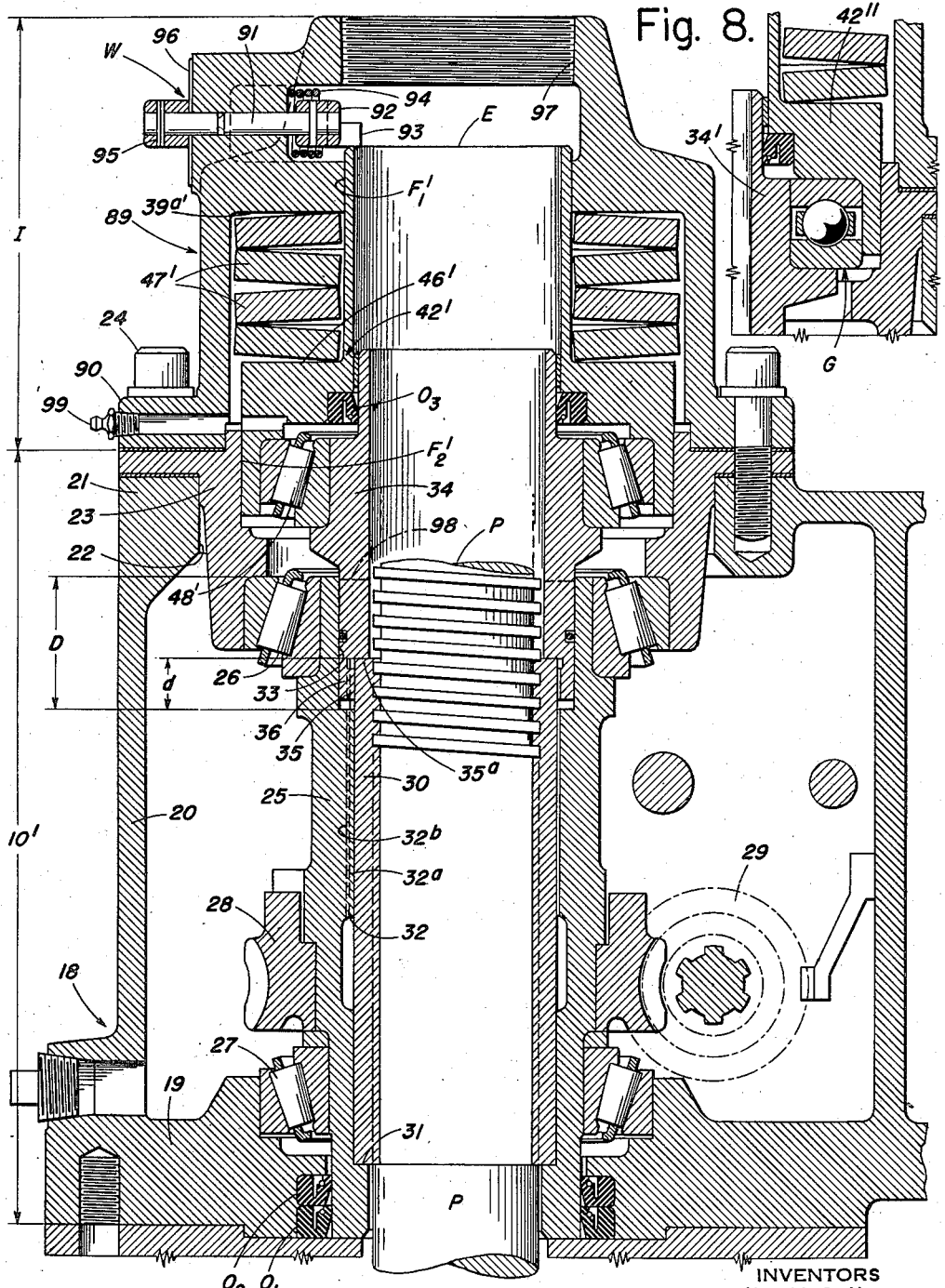
Fig. 6 is a view of the mechanism similar to that of Fig. 5, although with the lower end of the mechanism included, and the third section omitted, but with the second section modified to include the spring compression indicator device.

According to the Fig. 6 embodiment, the basic operating section 10 of the actuating mechanism comprises a basic housing 18 having a bottom portion 19, a vertical wall portion 20, and a top portion 21 with opening 22 into which is fitted a flanged annular bearing retainer plate 23 held down by screw bolts 24. Rotatably mounted within this basic housing 18 is a master drive sleeve 25 (corresponding to the one indicated at 12 in Fig. 1). This drive sleeve 25 is axially confined as between an upper roller bearing 26 mounted in the annular retainer plate 23, and a lower roller bearing 27 mounted in the bottom portion of the housing, each of these roller bearings being in the nature of a combined thrust—and guide—bearing for the drive sleeve 25.

The master drive sleeve 25 is rotated by a worm gear 28 mounted upon it and which in turn is driven by a worm indicated at 29 driven by motor 13 as part of the power driven basic mechanism to effect the opening and closing of the valve. An internally threaded drive nut 30 engaging the externally threaded valve stem is provided within the drive sleeve 25, the nut 30 being seated downwardly upon an internal abutment shoulder 31 formed by the sleeve 25, and having with the sleeve a torque transmitting spline connection 32.

This spline connection comprises vertical outer ribs 32a formed upon the nut 30 to engage in corresponding inwardly facing vertical grooves 32b formed in the drive sleeve 25. The upper end of drive sleeve 25 is formed with an inner annular recess 33 of a depth D sufficient to expose the upper end portion $d$ of the splining ribs 32a of the nut. The annular recess 33 thus forms a socket space for the reception of a cylindrical rotatable adaptor thrust transmitting member 34 which constitutes a characteristic part of this invention. This adaptor thrust transmitting member 34 is formed at its bottom with an inner annular recess 35 to fit over the top end portion of the driving nut 30, and it is seated thereon as indicated at 35a. Moreover, the recessed lower end portion of the adaptor thrust transmitting member 34 is formed with inwardly facing vertical grooves 36 for the reception therein of the upper end portion $d$ of the vertical ribs 32a of spline connection 32, whereby the drive nut 30 and the adaptor member 34 will rotate as one.

By reference to the Fig. 5 embodiment there now follows the description of operating sections 15 and 16 of the mechanism M of Fig. 1. It should be noted here that the basic operating section 10¹ of Fig. 6 is substantially identical to the corresponding basic section 10 of Fig. 5 and Fig. 1, except for a difference in the shape of the upper portion of the adaptor thrust transmitting member designated by the numeral 34 in the Fig. 6 embodiment as compared with that designated by the numeral 34¹ in the Fig. 5 embodiment of the invention.

The second operating section 15 (see Fig. 1 and Fig. 5) of mechanism M comprises a second housing 37 downwardly open and formed with a bottom flange 38 whereby it is fastened to the basic housing 18¹ and atop the annular bearing retainer plate 23¹ corresponding to the identical retainer plate 23 of Fig. 6. The second housing 37 has a vertical wall portion 39 and a flanged top portion 40 provided with a central opening 41, and an internal shoulder 39a serving as an upper annular pressure face.

The thrust-responsive compensating device in the second section 15 comprises a spring-loaded thrust member 42 characteristically bell-shaped to comprise a lower cylindrical hollow body portion 43 from the top of which rises an upper cylindrical neck portion 45 of substantially smaller diameter forming with the body portion an annular shoulder portion 46 providing a lower annular pressure face supporting a set of superposed annular disc springs 47 surrounding the neck portion 45. These springs are dished and reversely tilted relative to each other.

The non-rotatable thrust member 42 is supported upon the rotatable adaptor thrust transmitting member 34¹ by means of an auxiliary thrust bearing means 48 housed within the body portion 43, the bearing means 48 in turn being seated upon and carried by the adaptor thrust member 34¹ as upon a protruding annular shoulder 50 formed thereon.

It is important here to note that the spring-loaded bell-shaped thrust member 42 is guided at the top as well as at the bottom end by way of cylindrical sliding fits at $F_1$ and $F_2$ respectively and provided by the surrounding housing portions. That is to say, the top end of the neck portion 45 has a cylindrical sliding fit $F_1$ in the top opening 41 of housing 37, whereas the bottom end of the body portion 43 has a cylindrical sliding fit $F_2$ in the annular retainer plate 23¹. In this way, an effective vertical guidance is provided for the bell-shaped thrust member 42 inasmuch as the annular bearing retainer plate 23¹ is centered with respect to the basic housing as at 51, whereas the second housing 37 in turn is centered with respect to the retainer plate $23^1$ as at 52. Because of this effective centering and guide arrangement for insuring faultless vertical axial displacement of the bell-shaped thrust member 42, it is in fact possible to substitute an annular vertical thrust ball bearing (see Fig. 8) in lieu of the conical roller thrust bearing shown in the present embodiment.

Before proceeding with the detailed description of the third or top operating section 16 of Fig. 5 and Fig. 1, it should be noted that the operational indicating devices contained therein are actuated by a tubular extension member 53 telescopically seated in the top end portion of the adaptor thrust transmitting member $34^1$ and fixedly held therein as by means of a set screw 54. This tubular extension member 53 therefore is rotatable unitarily with the drive nut $30^1$, rising through the second operating section 15 and thus through the bell-shaped thrust member 42. Hence, this tubular extension member 53 rises a distance H up into the third operating section 15, and the extension member in turn provides clear passages for the axial movement therethrough of valve stem P.

The third or top operating section herein also termed the instrument box comprises a third housing 55 fastened to the second section 15 as by means of bolts 56, the third housing being centered at $55^a$ relative to the second section 15 and with respect to the axis of the valve spindle P. The third housing 55 comprises a bottom portion 57, a vertical wall portion 58 terminating upwardly in a rim or flange portion 59 closed by a removable cover plate 60 fastened to the rim 59 and provided with a threaded opening 61 concentric with the spindle axis to allow the spindle to pass therethrough.

The bottom portion 57 of the third housing has an opening 62 for receiving the foot portion of a cylindrical gear member 63 rotatable with the tubular extension member 53 through a key or spline connection indicated at 64. That is to say, the gear member 63 has a helically toothed cylindrical top portion 66 and a flanged base—or bottom—portion 67 lodging within the bottom opening 61 of the housing. Downwardly from the flange this gear member is shown to terminate in a cylindrical skirt portion 68 whereby it rests rotatably upon the top of the second housing 37.

The flanged base portion 67 of the gear member being substantially flush at the top with the top face of bottom portion 57, is held against axial displacement by means of retainer ring 69 held to the bottom portion 57 as by means of fastening screws 70. In this way, the gear member 63 will rotate together with the drive nut $30^1$ in driving engagement with a train of instrument gears in spite of vertical displacement of the tubular extension member 53 resulting from the axial reaction forces exerted upon the valve stem.

A valve stem position indicating device R (see Fig. 2 and Fig. 5) contained in the third operating section 16 is actuated or driven by the rotation of the cylindrical gear member 63 just described, and it comprises a helical gear 71 fixed upon one end of a primary horizontal shaft 72 and meshing with the helical gear member 63. The primary shaft 72 rotates in a primary horizontal bearing indicated at 73, the opposite end of shaft 72 having fixed thereto another helical gear 74 (see Fig. 5) meshing with a companion helical gear 75 mounted on a secondary horizontal shaft 76 extending above and at right angles to the primary shaft 72. The secondary shaft 76 is mounted and embraced by a secondary bearing structure 77 which is U-shaped in plan view and is rigidly connected to or unitary with the primary bearing 73. This primary bearing 73 has a base or flange portion $73^a$ whereby it is bolted to the bottom portion 57 of the housing, the bolts being indicated at 78. The secondary horizontal shaft 76 (see Fig. 2) penetrates the wall of the housing and carries upon its outer end an indicator pointer 79 for registering the position of the valve stem relative to a gradual dial 80 fastened to the outside of the housing.

A spring compression indicating device V contained in the third housing 55 registers the valve seating pressure or axial compression force exerted upon the valve stem in terms of the measurable compression of the superposed disc springs 47. That device comprises a horizontal rocker shaft 82 extending parallel to the aforementioned secondary shaft 76 although spaced a horizontal distance "$t$" therefrom. The rocker shaft 82 has its inner end rotatably mounted in a bearing 83 (see Figs. 2 and 5), that bearing also being unitary with and rising from aforementioned horizontal bearing structure 73. The rocker shaft 82 has fixed upon its inner free end a rocker arm or feeler 84 carrying a cam roller 85 held in spring-urged contact with the top edge of the aforementioned tubular extension member 53 as by means of a spring $85^a$ encircling the respective end portion of the rocker shaft. The outer end portion of the rocker shaft 82 has a bearing 86 provided in the wall of the housing, and penetrating the wall carries upon its exposed free end an indicator arm or pointer 87 moving together with the rocker arm 84 responsive to vertical axial displacement of the tubular extension member 53. The amount of displacement in terms of spring compression is registered by the pointer 87 relative to a graduated scale plate 88 provided upon the outside of the housing and disposed substantially in a plane with the indicator dial 80 of the companion stem position indicator device R.

The Fig. 6 embodiment differs from the Fig. 5 embodiment in that it lacks the third section or instrument box. The Fig. 6 embodiment merely comprises a second operating section I which contains thrust responsive devices substantially identical to those housed in the second operating section 15 of the Fig. 5 embodiment, along with a rocker type spring compression indicating device W similar to the device V contained in the third section or instrument box 16 of the Fig. 5 embodiment.

The second section I of Fig. 6 comprises a bell-shaped housing 89 formed with a bottom flange 90 fastened to the top of the basic housing 18 by the initially mentioned bolts 24, with the flanged retainer plate 23 interposed between the basic housing 18 and the housing 89 above.

The thrust-responsive device contained in housing 89 comprises parts identical to corresponding parts of the Fig. 5 embodiment, and designated by identical numerals except for the addition of the prime sign to these numerals. Hence, the thrust-responsive means in Fig. 6 comprise the conical thrust bearing $48^1$ carried by the rotary adaptor thrust transmitting member 34, and supporting the non-rotary bell-shaped thrust member $42^1$ which in turn is guided in the surrounding housing portions for vertical displacement, by an upper cylindrical sliding fit $F_1^1$ and a lower cylindrical sliding fit $F_2^1$. The non-rotary thrust member $42^1$ has an annular shoulder $46^1$ presenting a lower pressure face or seat for a set of superposed disc springs $47^1$ so that the disc springs are confined between that face and a corresponding upper annular pressure face $39^{a1}$ provided by the top end of the housing 89.

The spring compression indicating device W of the Fig. 6 embodiment comprises a horizontal rocker shaft 91 rotatable in the top portion of the housing 89, its inner end having fixed thereon a rocker arm 92 provided with a terminal cam portion 93 urged against the top edge E of the non-rotary bell-shaped thrust member $42^1$ by means of a coiled torsional spring 94 encircling that end of the rocker shaft 91. The outer end of the rocker shaft protruding outwardly from the housing has fixed thereon an indicator arm or pointer 95 associated with a graduated scale plate 96 fastened to the outside of the housing to register thereon the degree of compression of the annular spring washers as a measure of the magnitude of the thrust reaction force exerted by the stem. The housing 89 has a threaded top opening 97 to provide for the passage therethrough of the valve stem P.

Figure 7:
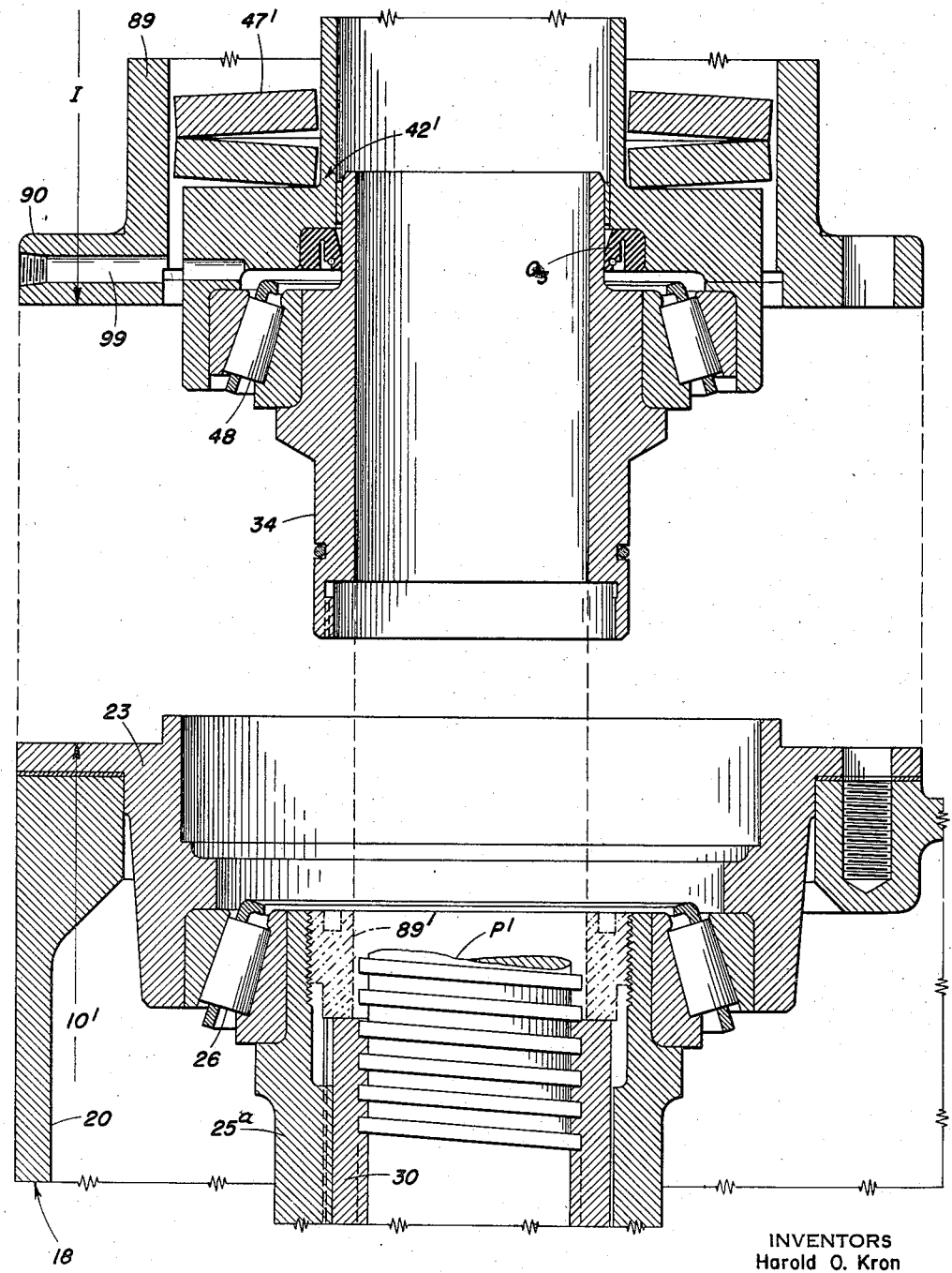
Fig. 7 is a view of the Fig. 6 embodiment exploded in such a manner as to illustrate the feature of convertibility of the basic valve actuating mechanism into an actuating unit provided with a thrust-responsive protective device.

The Fig. 7 exploded view shows the second operating section I including the adaptor thrust transmitting member 34 lifted off the basic operating section 10¹. This illustrates the feature according to which a basic valve actuating mechanism lacking the thrust-responsive protective means is convertible into one that is thrust-responsive. Therefore, the basic mechanism of section 10¹ is here indicated as having a lock nut or retainer nut 89¹ (in dot-and-dash) for confining the drive nut 30 to its seat 31, securing it against upward axial displacement. An apertured flanged removable top cover may close the basic section 10¹ in the absence of the second operating section.

Clearly then, from Fig. 7, with the top cover and the retainer nut 89¹ removed from the basic section 10¹, the second section I can be put in place upon the basic section 10¹ by seating the adaptor thrust transmitting member 34 upon the drive nut 30 and establishing positive drive connection therewith, while bolting the housing 89 in place upon the basic housing 18, with the annular retainer plate 23 interposed between the basic housing 18 and the housing 89 above.

At 90 is shown a grease fill plug for maintaining the operating section 10¹ filled with grease. Accordingly, a pair of oil seal rings $O_1$ and $O_2$ are shown at the bottom of the basic housing 18, and an oil seal ring $O_3$ at the top.

The operation of the mechanism is rather self-explanatory from the Fig. 6 embodiment. That is to say, while the motor 13 drives the mechanism in a direction to rotate the drive nut 30 to raise the valve stem P to effect valve opening, the drive nut 30 will remain seated upon the abutment shoulder 31 at the bottom. Suitable limit switch devices provided under the cover 13ª (see Fig. 1) will cut off the motor power at the proper time at the end of the valve opening movement.

If the motor rotates the drive nut 30 in the opposite direction to lower the stem P to effect valve-closing, suitable limit switch devices will again operate to cut off the motor power at a suitable point when the valve is seating. However, the momentum of the motor and of the parts of the mechanism may produce the phenomenon of "overrunning" whereby undue pressure may be exerted upon the valve seat and upon the stem. However, undue pressure condition or shock is prevented and any possible damage to the parts avoided by the operation of the thrust-responsive compensating means in section I of the mechanism. That is to say, any excess momentum or axial thrust reaction upon valve closing will cause a corresponding axial upward displacement of the drive nut 30 in drive sleeve 25, the adaptor thrust transmitting member 34 with its thrust bearing 48' and the bell-shaped thrust member 45, whereupon the momentum will be absorbed by a corresponding compression of the superposed dished disc springs 47¹, thereby protecting the valve seat against excessive seating pressure and the stem and other moving parts against excessive strain and wear and tear or damage. The extent of valve seating pressure is indicated by the spring compression indicator W the function of which is a true reflection of the pressure with the thrust member 42¹ being effectively guided as at $F_1^1$ and $F_2^1$. If the dynamic conditions or pressures are found to be such as to require correction, such correction can be easily effected due to the accessibility of the set of superposed disc springs contained in the housing 89 as in a cartridge chamber. That is to say, weaker or stronger disc springs can be quickly substituted without disturbance of the actuating mchanism proper, or individual disc springs can be removed or added as the case may be.

The extent of valve opening or closing in terms of the axial position of the valve stem is ascertainable by the indications of the pointer 79 of the position indicating device R as in the Fig. 5 embodiment, when this pointer 79 reaches its end position, the thrust indicating device V takes over to register the extent of valve seating pressure or axial thrust reaction exerted upon the valve stem, at which time both pointers 79 and 87 move together. Objectionable thrust may also be experienced due to thermal expansion of the valve stem even after the valve member has been seated, in which case the thrust responsive means with the annular spring washers will function to prevent damage to the parts from excess pressures, while the thrust indicating device V will register the degree of pressure that may have developed.

The detail view of Fig. 8 shows the non-rotational bell-shaped thrust member of Fig. 6 supported by a vertical ball thrust bearing G instead of by the conical roller bearing 48¹, thus emphasizing a structural organization governed by the fact that the thrust member 42¹ is in itself vertically guided as by the sliding fits $F_1^1$ at the top and $F_2^1$ at the bottom. In the detail view of Fig. 8 the thrust member G is functionally interposed between the rotational adaptor thrust transmitting member 34¹ (which corresponds to the adaptor thrust transmitting member 34 of Fig. 6) and the non-rotational bell-shaped thrust member 42" (which corresponds to the thrust member 42¹ of Fig. 6).

Reverting to the feature of convertibility set forth above and illustrated in the exploded view of Fig. 7, the drive sleeve therein is designated 25ª as distinct from the similar drive sleeve 25 in Fig. 6.

The distinction lies in the fact that the drive sleeve 25ª of Fig. 7 is threaded at the top for the reception of the retainer nut 89', whereas the drive sleeve 25 of Fig. 6 lacks the thread. That is to say, for the purpose of convertibility, an unthreaded sleeve 25 may be substituted instead of the threaded drive sleeve 25. Other modes of applying the principle of the invention may be employed, change being made as regards the details described, provided that there be employed the features described in the claims or the functional as well as conjointly co-operative equivalents of such features.

We claim:

1. A valve construction having a threaded rotatable valve stem rising from the valve gate axially movable to open and to close the valve gate by means of a drive mechanism, carried by the yoke structure of the valve, comprising an internally threaded rotatable drive nut engaging the valve stem and having limited axial movement therewith, a motor-operated rotatable drive sleeve around the drive nut for driving the latter rotationally, means for limiting downward axial movement of the drive nut within the drive sleeve, a pair of annular thrust bearing means with one encircling the upper portion of the drive sleeve and one encircling the bottom portion thereof for rendering the rotatable drive sleeve axially immovable, an open-topped main housing for the foregoing elements, a second housing having an axial opening while supported from the main housing and providing a shoulder presenting an upper pressure face, a non-rotatable but axially movable bell-shaped thrust member having an upstanding annular neck portion entering the opening in the second housing and through which the valve stem passes while the exterior of the bell portion presents a lower pressure face, spring means located around said neck portion and extending between the two pressure faces for exerting spring thrust on the lower pressure face to urge the bell-shaped thrust member downwardly, and means for transmitting at one time upward spring-compressing thrust from the drive nut to the bell-shaped thrust member and through the latter to the spring means as well as for transmitting at another time thrust from the spring means through the bell-shaped thrust member downwardly to the drive nut, which thrust-transmitting means have an annular adaptor thrust transmitting member in abutting contact with the drive nut to be both driven rotationally thereby and moved axially thereby, and auxiliary annular thrust bearing means carried between the adaptor member and the bell-shaped thrust member whereby the bell-shaped member and the adaptor member as well as the thrust bearing means move axially as a unit while the adaptor member can move additionally rotationally.

2. A valve construction according to claim 1, wherein the spring means comprise a plurality of superposed oppositely tilted disc springs.

3. A valve construction according to claim 1, wherein there is an annular bearing retainer member held in place from between the adjacent ends of the main and second housings for supporting the upper thrust bearing on the drive sleeve and for guiding axial movement of the bell-shaped thrust member.

4. A valve construction according to claim 1, with the addition of spring compression indicator means comprising a rocker device mounted in the second housing and having a feeler arm spring-urged against the top edge of the cylindrical neck portion of the bell-shaped thrust member as well as an indicator member outside the housing to move in unison with the feeler arm in response to thrust reaction displacement of the bell-shaped thrust member.

5. A valve construction according to claim 1, with the addition of a third housing atop the second housing and containing a revolution counting device for the drive nut indicative of the position of the valve stem during its opening and closing as well as a spring compression indicating device, the third housing enclosing the indicating devices being detachably fastened to the second housing, a rotatable but non-axially movable cylindrical gear member in the bottom portion of the third housing and concentric with the stem axis, a tubular extension sleeve telescopically seated in and removably fastened to the adaptor member to extend upwardly through the second housing into splined driving engagement with said cylindrical gear member, with the top edge portion of the extension sleeve rising above the gear member as a result of thrust reaction of the stem, a horizontal revolution indicating shaft rotatable in the third housing and having an end portion extending through the wall thereof to indicate the revolutions with a gear train operatively interconnecting the cylindrical gear member with said revolution indicating shaft, and a rocker device also mounted in the third housing having a feeler arm within the housing spring-urged against the top edge of the extension sleeve, and an indicator member outside the housing to move in unison with the feeler arm in response to thrust reaction displacement of the extension sleeve.

6. A valve construction according to claim 1, wherein the spring means are housed in a space bounded by the two pressure faces, the inner wall of the second housing, and the neck portion of the bell-shaped thrust member, whereby the latter lies between the spring means and the valve stem as it moves through the neck portion during valve opening and closing.

7. A valve construction having a threaded rotatable valve stem rising from the valve gate axially movable to open and to close the valve gate by means of a drive mechanism carried by the yoke structure of the valve, comprising an internally threaded rotatable drive nut engaging the valve stem and having limited axial movement therewith, a motor-operated rotatable drive sleeve around the drive nut for driving the latter rotationally, means for limiting downward axial movement of the drive nut within the drive sleeve, an upper and a lower annular thrust bearing means supported from the hereinafter described main housing and encircling the drive sleeve for preventing axial movement thereof, a rotatable and axially movable annular adaptor thrust transmitting member whose lower end engages the upper end of the drive nut and lies between the latter and the upper end of the drive sleeve whereby the adaptor is rotated with and by the rotating drive sleeve when the drive nut is rotated by the motor-operated sleeve so that the three elements then rotate together while having limited axial movement of the adaptor when so moved by the drive nut, and an auxiliary annular thrust bearing encircling and supported from the adaptor member for axial movement therewith, a fixed annular bearing retainer member in which are held the upper thrust bearing means that encircles the upper end of the drive sleeve, an open-topped main housing supporting the bearing retainer member and encasing the foregoing elements, a non-rotatable but axially movable bell-shaped annular thrust member engaging the thrust bearing supported from the adaptor member while presenting a shoulder serving as an annular pressure face and having an upstanding neck portion secured against rotation by engagement of the bell-shaped portion with the bearing retainer member, a removable second housing supported from the main housing having an opening into which enters the neck portion of the non-rotatable bell-shaped thrust member and presenting a shoulder serving as another pressure face, and a plurality of superposed tilted disc springs encircling the neck portion of the bell-shaped member while lying between said annular pressure faces for spring-urging axial movement of the bell-shaped member as well as the adaptor member together with its encircling bearing and being so arranged and constructed as to be exposed to view and to individual replacement upon removal of the second housing.

References Cited in the file of this patent
UNITED STATES PATENTS

| | | |
|---|---|---|
| 2,222,699 | Ball | Nov. 26, 1940 |
| 2,240,977 | Bryant et al. | May 6, 1941 |
| 2,317,529 | Hodgson et al. | Apr. 27, 1943 |
| 2,351,211 | Hodgson | June 13, 1944 |
| 2,623,403 | Terdina | Dec. 30, 1952 |
| 2,753,030 | Wight | July 3, 1956 |